United States Patent [19]

Uchiyama et al.

[11] Patent Number: 4,889,762

[45] Date of Patent: Dec. 26, 1989

[54] MOLDED ARTICLES OF THERMOPLASTIC ELASTOMER

[75] Inventors: Akira Uchiyama, Ichihara; Katsuo Okamoto, Funabashi, both of Japan

[73] Assignees: Mitsui Petrochemical Industries Ltd., Tokyo; Tokushu Shikiryo Color & Chemical Inc., Chiba, both of Japan

[21] Appl. No.: 137,054

[22] Filed: Dec. 23, 1987

[30] Foreign Application Priority Data

Dec. 26, 1986 [JP]  Japan ................................ 61-310649

[51] Int. Cl.$^4$ .......................... B32B 27/14; B29J 01/04
[52] U.S. Cl. ...................................... 428/195; 428/216; 428/331; 428/423.7; 428/424.8; 428/516; 428/483; 428/901
[58] Field of Search ............ 428/195, 216, 331, 423.7, 428/424.8, 483, 516, 904

[56] References Cited

U.S. PATENT DOCUMENTS

| | | | |
|---|---|---|---|
| 4,569,887 | 2/1986 | Cowles | 428/483 |
| 4,684,578 | 8/1987 | Inoue et al. | 428/483 |
| 4,725,506 | 2/1988 | Nagano | 428/516 |
| 4,752,532 | 6/1988 | Starka | 428/483 |

FOREIGN PATENT DOCUMENTS 197741 10/1985 Japan .

Primary Examiner—P. C. Ives
Attorney, Agent, or Firm—Sherman and Shalloway

[57] ABSTRACT

Molded articles of thermoplastic elastomer obtained in accordance with the present invention comprise a molded product prepared from a thermoplastic elastomer containing a partially cross-linked product of ethylene/α-olefin copolymer rubber and a polyolefin resin, a primer layer containing at least one compound selected from the group of saturated polyesters and chlorinated polyolefins and formed on the surface of said molded article, and a topcoat layer containing at least one compound selected from the group of saturated polyesters, acrylic ester resins, polyvinyl chloride and polyisocyanate (provided that the topcoat layer contains at least the acrylic ester resin when the primer layer consists only of the saturated polyester) and formed on said primer layer. The molded articles of the invention mentioned above have such excellent surface characteristics that the surface thereof is hard to get a scratch, excellent in appearance as well as in touch and, moreover, is hard to subject to attack by hydrocarbon solvents.

10 Claims, No Drawings

MOLDED ARTICLES OF THERMOPLASTIC ELASTOMER

FIELD OF THE INVENTION

This invention relates to molded article of thermoplastic elastomer used as interior automotive sheets or the like, and more particularly to molded articles of thermoplastic elastomer having excellent surface characteristics.

BACKGROUND OF THE INVENTION

Heretofore, non-rigid polyvinyl chloride or polyblends comprising non-rigid polyvinyl chloride and ABS resins have been mainly used for the preparation of interior automotive sheets for use as outer skins of instrument panel pads or door trim. In the use of this non-rigid polyvinyl chloride for the purpose intended, however, there were involved such problems that because of large amounts of plasticizers present in the non-rigid polyvinyl chloride, a window glass of automobile tarnishes owing to volatilization of the plasticizers, the interior automotive sheets are deteriorated and discolored by ultraviolet light of sunlight incident through automotive windows or by thermal decomposition. Particularly, a further serious problem was that the non-rigid polyvinyl chloride sometimes undergoes brittle fracture in a cold district.

In recent years, owing to such circumstances, interior sheets prepared from polyolefin resins such as polypropylene have come to be used. However, molded articles, such as interior sheets comprising polyolefin resins had such problems that the molded articles are liable to receive scratches on the surface thereof, poor in external appearance because of excessively high surface gloss as well as in touch because of surface roughness and, moreover, the surface of said molded articles are apt to be attacked by hydrocarbon solvents.

In order to solve such problems as mentioned above, there have been made various attempts, for instance, Japanese Patent Laid-Open-to-Public Publn. No. 197741/1985 proposes a process for preparing sheets for use in interior automotive decoration, characterized in that the sheet is formed from a thermoplastic elastomer comprising a polyolefin resin and a partially cross-linked type ethylene/α-olefin copolymer rubber, and on the surface of the thus formed sheet is coated a reactive paint containing a saturated polyester resin, acrylic ester resin or an isocyanate resin.

The sheet prepared by the process disclosed in this Japanese Patent L-O-P Publn. No. 197741/1985 cannot be said to have sufficiently excellent surface characteristics, though such surface characteristics as surface abrasion resistance has been improved in comparison with the sheet obtained by said process but omitting the reactive paint coating step, and hus a further improvement in surface characteristics has been desired therefor.

The present inventors conducted extensive research with the view of obtaining molded articles of thermoplastic elastomer, such as interior automotive leather-like sheets excellent in surface characteristics, and eventually found that molded articles having excellent surface characteristics are obtained by coating a primer having a specific composition on the surface of molded articles prepared from thermoplastic elastomers to form a primer layer thereon, and then applying the aforesaid reactive paint onto the surface of the thus formed primer layer.

OBJECT OF THE INVENTION

The present invention is intended to solve such problems associated with the prior art as mentioned above, and its object is to provide molded articles prepared from thermoplastic elastomers for use as interior automotive sheets or the like, the surface of which is hard to get scratches and excellent in external appearance as well as in touch and, moreover, is hard to subject to an attack by hydrocarbon solvents.

SUMMARY OF THE INVENTION

The molded articles prepared from thermoplastic elastomers in accordance with the present invention are characterized by having a primer layer containing at least one compound selected from among saturated polyesters and chlorinated polyolefins, said primer layer being coated on the surface of a molded article prepared from a thermoplastic elastomer containing a partially cross-linked product of an ethylene/α-olefin copolymer rubber and, if necessary, a polyolefin resin, and on the primer layer a topcoat layer containing at least one compound selected from among saturated polyesters, acrylic ester resins, polyvinyl chloride and polyisocyanate (provided that said topcoat layer contains at least an acrylic ester resin when said primer layer consists only of a saturated polyester).

The thermoplastic elastomer molded articles of the present invention have such excellent surface characteristics that the surface thereof is hard to get scratches, excellent in external appearance as well as in touch and, moreover, is hard to subject to an attack by hydrocarbon solvent since they have on the surface of a molded article prepared from a thermoplastic estomer containing a partially cross-linked product of an ethylene/α-olefin copolymer rubber and, if necessary, a polyolefin resin, a primer layer having a specific composition and a topcoat layer having a specific composition in that order.

DETAILED DESCRIPTION OF THE INVENTION

The molded articles of thermoplastic elastomer of the present invention, which are used as interior automotive sheets or the like, are illustrated below in detail.

The thermoplastic elastomers used in the present invention contain as an essential component a partially cross-linked product of an ethylene/α-olefin copolymer rubber and, if necessary, a polyolefin resin. Representatives of such thermoplastic elastomers are preferably those which are formed from a composition comprising;

100-30 parts by weight of a partially cross-linked copolymer rubber composition (I) obtained by dynamically heat treating in the presence of a crosslinker a mixture comprising
  (a) 100-20 parts by weight of an ethylene/α-olefin copolymer rubber,
  (b) 0-80 parts by weight of a polyolefin resin (herein the amount of (a)+(b) is selected so as to become 100 parts by weight),
and if necessary
0-200 parts by weight (preferably 0-100 parts by weight) of at least one component selected from the group of
  (c) peroxide non-crosslinking type hydrocarbon rubbery substances and (d) mineral oil type softening agents, and
0–70 parts by weight of a polyolefin resin (II).

The above-mentioned thermoplastic elastomers used in the present invention may further be exemplified concretely with reference to the following compositions.

(1) A thermoplastic elastomer composition, i.e. a partially cross-linked copolymer rubber composition (I) obtained by dynamically heat treating in the presence of a crosslinker a mixture (I) comprising;
   (a) 100–20, preferably 90–20 parts by weight of an ethylene/α-olefin copolymer rubber, and
   (b) 0–80, preferably 10–80 parts by weight of a polyolefin resin, or
a mixture (II) comprising;
   a blend of 100 parts by weight of the mixture (I) and 0–200, preferably 3–100 more preferably 5–100 parts by weight of
   (c) a peroxide non-crosslinking type hydrocarbon rubbery substance and/or
   (d) a mineral oil type softening agent.

(2) A thermoplastic elastomer composition comprising a mixture containing 100 parts by weight of a thermoplastic elastomer composition comprising the above-mentioned partially cross-linked copolymer rubber (I) and up to 700/3 parts by weight (about 233 parts by weight), based on the copolymer rubber (I), of a polyolefin resin (II).

In the present invention, there may also be used as the thermoplastic elastomer the following thermoplastic elastomer composition.

(3) A thermoplastic elastomer composition comprising a mixture containing;
   100–20, preferably 90–20 parts by weight of a partially cross-linked product of an ethylene/α-olefin copolymer rubber (I) obtained by statically heat treating, for example, heat treatment of the rubber mixture by pressing, in the presence of a cross-linker, (a) an ethylene/α-olefin copolymer rubber or a mixture of 100 parts by weight of said copolymer rubber (a) and up to 200, preferably 200 parts by weight, based on the copolymer rubber (a), of (c) a peroxide non-crosslinking type rubbery substance and/or (d) a mineral oil type softening agent, and 10–80 parts by weight of a polyolefin resin (II).

Of the above-exemplified thermoplastic elastomer compositions (1)–(3), preferably used are the thermoplastic elastomers shown in (1) and (2) above.

In the present invention, it is not preferable to use uncrosslinked elastomer compositions in place of partially cross-linked thermoplastic elastomer compositions because the polymer compositions obtained thereby decrease in tensile characteristics, heat resistance or oil resistance.

The ethylene/α-olefin copolymer rubber (a) which is a starting material for the thermoplastic elastomer used in the present invention includes substantially amorphous copolymer rubbers comprising mainly ethylene and α-olefin of 3–14 carbon atoms, for example, ethylene/propylene copolymer rubber, ethylene/propylene/non-conjugated diene terpolymer or multi-component copolymer rubber, ethylene/butadiene copolymer rubber, ethylene-1-butene copolymer rubber, and ethylene/1-butene/non-conjugated diene multi-component copolymer rubber, or mixtures thereof. Of these copolymer rubbers, preferred are ethylene/propylene copolymer rubber and ethylene/propylene/non-conjugated diene terpolymer.

The non-conjugated diene referred to in the above-mentioned copolymer rubbers signifies dicyclopentadiene, 1,4-hexadiene, cyclooctadiene, methylenenorbornene, 5-ethylidene-2-norbornene, etc., and copolymers containing as a third component dicyclopentadiene or 5-ethylidene-2-norbornene are preferred.

These copolymers or multi-component polymers have Mooney viscosity [$ML_{1+4}$ (100° C.)] of 10–180, preferably 40–140, and an iodine value (unsaturation degree) of preferably less than 16.

As the amount of each constituent unit contained in these copolymer rubbers at the 1-olefin moiety, a proportion of ethylene unit/α-olefin unit is 50/50 to 92/8, preferably 70/30 to 85/15 (molar ratio), and a proportion of 1-olefin (ethylene+α-olefin) unit/non-conjugated diene unit is usually 100/0–90/10, preferably 98/2 to 90/10, more preferably 97/3 to 94/6.

The polyolefin resin (b) to be mixed with the ethylene/α-olefin copolymer rubber at the time of dynamic heat treatment includes resinous high molecular substances, for example, homopolymers of 1-olefin such as ethylene, propylene, butene-1, hexene-1, 4-methyl-1-pentene, etc., copolymers of these monomers, or copolymers of α-olefin and less than 15 mol % of other polymeric monomers, for example, ethylene/vinyl acetate copolymers, ethylene/acrylic acid copolymer, ethylene/methyl acrylate copolymers, ethylene/ethyl acrylate copolymers, ethylene/methacrylic acid copolymers, ethylene/methyl methacrylate copolymers, etc. Of these polyolefin resins, preferably used are those having a melt index (ASTM-D-1238-c65T) of 0.1–50 g/10 min, particularly 5–20 g/10 min and a crystallinity index of 40% or higer as obtained by X-ray diffractometry.

Of the above-illustrated polyolefin resins (b), those which may be exemplified as the preferred polyolefin resin (b) are peroxide decomposition type polyolefin resins (polyolefin resins which decrease in molecular weight and increase in flowability of resin by thermal decomposition when mixed with a peroxide followed by kneading under application of heat) having a melt index of 0.1–50 g/10 min and a crystallinity index of 40% or higher. The peroxide decomposition type polyolefin resins exemplified above include isotactic polypropylene or copolymers of propylene and less than 15 mol % of other α-olefins, for example, propylene/ethylene copolymers, propylene/1-butene copolymers, propylene/1-hexene copolymers and propylene/4-methyl-1-pentene copolymers.

Where sheet-like molded articles are intended, use is preferably made of a mixture of the above-mentioned peroxide decomposition type polyolefin resin and a peroxide crosslinking type polyolefin resin (a polyolefin resin which decreases in flowability of resin by cross-linking when mixed with a peroxide followed by kneading under application of heat), for example, a low, medium or high density polyethylene having a density of 0.910 to 0.940, in a proportion by weight of 100/0 to 30/70, particularly 40/20 to 20/40, because of excellent film forming properties of the mixture. The thermoplastic elastomer compositions comprising a mixture of (a) 30–50 parts by weight of an ethylene/α-olefin copolymer, (b) 20–40 parts by weight of a polypropylene resin and 20–40 parts by weight of a polyethylene resin and, if necessary, (c) a peroxide non-crosslinking type hydrocarbon rubbery substance and/or (d) a mineral oil, said mixture having been dynamically crosslinked, are particularly preferred since the sheet-like articles obtained therefrom are excellent in physical properties.

The peroxide non-crosslinking type hydrocarbon rubbery substance (c) which is an optional component used at the time of preparation of the thermoplastic elastomer signifies a hydrocarbon type rubbery substance which does not crosslink even when mixed with a peroxide and kneaded under application of heat and does not decrease in flowability, for example, polyisobutylene rubber, butyl rubber, propylene/ethylene copolymer rubber containing at least 70 mol % of propylene, propylene/1-butene copolymer rubber or atactic polypropylene. Among these, most preferred are polyisobutylene rubber, butyl rubber and propylene/1-butene copolymer rubber.

The mineral oil type softening agent (d) is a high boiling petroleum fraction which is used for weakening the intramolecular forces of rubber when rubber is roll processed, thereby facilitating the processing of rubber and, at the same time, promoting dispersion of carbon black or white carbon in the rubber, reducing hardness of vulcanized rubber, or increasing flexibility or elasticity. The high boiling petroleum fractions of the paraffin, naphthene or aromatic type may be used.

In preparing the thermoplastic elastomers, the incorporation of such peroxide non-crosslinking type hydrocarbon rubbery substance (c) and/or mineral oil type softening agent (d) is not always necessary. However, in order to further improve flow characteristics, i.e. mold processing characteristics, of polymer compositions, it is desirable to add up to 200, preferably 3–100 parts by weight of the above-mentioned (c) and/or (d) to 100 parts by weight of the sum of an ethylene/α-olefin copolymer rubber (a) and a polyolefin resin (b).

The polyolefin resin (II) which is added, if necessary, after the dynamic heat treatment in accordance with the present invention includes resins similar to the polyolefin resin (b) added at the time of the dynamic heat treatment, that is, said polyolefin resin (II) includes homopolymers of 1-olefin such as ethylene, propylene, butene-1, hexene-1, 4-methyl-1-pentene, etc., copolymers of two or more of these monomers, or copolymers of α-olefin and less than 15 mol % of other polymeric monomers, for example, ethylene/vinyl acetate copolymers, ethylene/acrylic acid copolymers, ethylene/methyl acrylate copolymers, ethylene/ethyl acrylate copolymers, ethylene/methacrylic acid copolymers, ethylene/methyl methacrylate copolymers, etc. These polyolefin resins (II) preferably have a melt index (ASTM-D-1238-65T, 190° C. but 230° C. in case of propylene polymers) of 5–100, particularly 10–50. Where the polyolefin resins are added at the time of the dynamic heat treatment and also after said heat treatment, the polyolefin resin (b) and polyolefin resin (II) may be the same or different.

To prepare a partially cross-linked product of the ethylene/α-olefin copolymer rubber, which is one component of the thermoplastic elastomer used in the present invention, it is sufficient that 100 parts by weight of a blend comprising a mixture of 100–20 parts by weight of an ethylene/α-olefin copolymer rubber, 0–80 parts by weight of a polyolefin resin (b) and, if necessary, 0–200 parts by weight of a peroxide non-crosslinking type rubber (c) and/or a mineral oil type softening agents (d), is mixed with about 0.01–3%, preferably 0.05–3% more preferably 0.1–0.5% by weight, based on the blend, of a crosslinker and that the mixture dynamically heat treated to effect partial crosslinking.

By dynamic heat treatment as used herein is meant the fact that the kneading is effected in a molten state.

The kneading is preferably effected in a closed type apparatus and in an inert gas atmosphere such as nitrogen or carbon dioxide gas. The kneading temperature is usually 150°–280° C., preferably 170°–240° C., and the kneading time is usually 1–20 minutes, preferably 1–10 minutes.

Crosslinkers used for the intended partial crosslinking are organic peroxides, sulfur, phenol type vulcanizing agents, oximes, polyamine, etc. Of these crosslinkers, organic peroxides and phenol type vulcanizing agents are preferred from the standpoint of physical properties of the thermoplastic elastomers obtained.

Usable as the phenol type vulcanizing agents are alkylphenolformaldehyde resins, triazine-formaldehyde resins and melamine-formaldehyde resins.

Usable as the organic peroxides are dicumyl peroxide, di-tert-butylperoxide, 2,5-dimethyl-2,5-bis(tert-butylperoxy)hexane, 2,5-dimethyl-2,5-bis(tert-butylperoxy)hexine-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, dibenzoylperoxide, tert-butylperoxybenzoate, etc. Of these organic peroxides, bisperoxide type compounds are preferred in point of less odor and high scorch stability, and particularly optimal is 1,3-bis(tert-butylperoxyisopropyl)benzene.

At the time of effecting partial crosslinking heat treatment, the blending of such crosslinking aids such as p-quinonedioxime, p,p'-dibenzoylquinonedioxime, etc., of polyfunctional vinyl monomers such as divinylbenzene (DVB), diethylene glycol methacrylate, polyethylene diglycol methacrylate, etc. is preferable since a more uniform and mild crosslinking reaction can be realized. Particularly, the blending of divinylbenzene (DVB) is most preferred since the crosslinking effect obtained by the heat treatment is uniform, and thermoplastic elastomers well balanced between flowability and physical properties are obtained thereby.

The thermoplastic elastomers may further have incorporated therein fillers such as carbon black, clay, talc, calcium carbonate, calcium bicarbonate, kaolin, diatomaceous earth, silica, alumina, asbestos, graphite, glass fiber, etc. or antioxidants such as phenyl-α-naphthylamine, 2,6-ditertiary-butylphenol, tetrakis[methylene(3,5-di-tert-butyl-4-hydroxyphenyl)propionate], etc., weathering agents, flame retardants, antistatic agents and the like additives.

These fillers and additives may be added to the thermoplastic elastomers at the stage of preparation thereof or at the time of molding the prepared thermoplastic elastomers.

By partial crosslinking as used herein is meant that the composition after being crosslinked has been found to be crosslinked to such an extent that the crosslinked composition does not lose its properties as a thermoplastic elastomer, and usually is meant a composition having a gel content of at least 40% as measured by the following procedure. Of the crosslinked compositions, preferred are those having the gel content of at least 45%, particularly 70–99.5%.

The measurement of gel content is conducted in the following manner. About 100 mg of sample pellets of thermoplastic elastomer is weighed, and the sample pellets are placed in a closed container and immersed at 23° C. for 48 hours in 30 cc of cyclohexane, and thereafter the sample pellets are taken out therefrom and dried for at least 72 hours until no change in in weight is observed. From the weight of this dried residue is deducted a total weight of all the additives such as insoluble filler, pigment and the like other than the polymer component to obtain a corrected final weight (Y). On one hand, from the weight of the sample pellets is deducted a total weight of cyclohexane-insoluble components other than the ethylene/α-olefin copolymer, for example, a mineral oil or plasticizer, cyclohexane-soluble rubber, and insoluble components other than the polyolefin resin, such as a filler, pigment and the like, to obtain a corrected initial weight (X).

The gel content is decided from those values according to the following equation.

$$\text{Gel content (\%)} = \frac{\text{Corrected final weight }(Y)}{\text{Corrected initial weight }(X)} \times 100$$

The thermoplastic elastomers having the compositions as mentioned above are fed to a plastic processing machine such as an extruder equipped with T-die, a calender molding machine, etc., and molded according to the usual method into a desired form such as sheet-like article. At the time of molding the thermoplastic elastomer, desired pattern (emboss) may be formed on the sheet surface. Molded articles of thermoplastic elastomer thus molded have excellent physical properties, for example, weathering resistance, heat resistance, cold resistance or resistance to light.

To obtain a sheet-like article by molding the thermoplastic elastomer into sheet-like form, it is particularly preferable to use as the thermoplastic elastomer a partially cross-linked product of an ethylene/α-olefin copolymer rubber obtained by dynamically crosslinking a mixture containing (a) 30–50 parts by weight of an ethylene/α-olefin copolymer and (b) 20–40 parts by weight of a polypropylene resin and 20–40 parts by weight of a polyethylene resin and, if necessary, (c) a peroxide non-crosslinking type hydrocarbon rubbery substance and/or (d) a mineral oil, because the sheet-like article 50 obtained is excellent in physical properties.

The content ratio between the components (a) an ethylene/α-olefin copolymer and (b) a polyolefin resin in the thermoplastic elastomers can be determined by the D.S.C. method or the infrared absorbency analysis method. The contents of the components (c) a peroxide non-crosslinking type hydrocarbon rubbery sustance or (d) a mineral oil type softening agent in the composition can be determined by the solvent extraction method (Soxhlet extraction method using acetone as the solvent) or the infrared absorbance analysis method.

In the present invention, on the surface of a molded article of the above-mentioned thermoplastic elastomer, a primer layer containin at least one compound selected from among saturated polyesters and chlorinated polyolefins is first formed. To form the primer layer on the surface of the molded article, it is sufficient that at least one compound selected from among saturated polyesters and chlorinated polyolefins is dissolved in an organic solvent and a coating solution for forming the primer layer is coated according to the usual method on the surface of the molded article.

Saturated polyester resins used for forming the primer layer include polyethylene terephthalate, polybutylene terephthalate and derivatives thereof. Chlorinated polyolefin resins used for the same purpose include chlorinated polyethylene, chlorinated polypropylene, ethylene chloride/α-olefin copolymers.

The coating solution for forming the primer layer may have incorporated therein, if necessary, silicic acid anhydride (silica), pigments, delustering agents, etc. in addition to the above-mentioned saturated polyester resin or chlorinated ethylene/α-olefin copolymer.

In particular, the addition to the coating solution of silicic acid anhydride in an amout of up 100% by weight of the aforesaid polyester resin or chlorinated polyolefin is preferred.

The organic solvents used for dissolving the saturated polyester resin or chlorinated polyolefin resin include toluene, methyl ethyl ketone, ethyl acetate, methylene chloride, cyclohexanone, etc.

Of these solvents, particularly useful is a mixed solvent comprising toluene and methyl ethyl ketone. The solids concentration in the coating solution for forming the primer layer is 2–50% by weight, preferably about 10–15% by weight.

The film thickness of the primer layer formed on the surface of the molded article, prepared from the thermoplastic elastomer, is preferably about 10–20 μm.

When the primer layer mentioned above is formed on the molded article of thermoplastic elastomer, the primer-forming coating solution may be applied in a plurality of steps and, in that case, a plurality of primer forming-coating solutions having different compositions, but within the scope as specified in the present invention, may be used.

In the present invention, moreover, there can be provided, in addition to the aforesaid primer layer (an undercoat layer), a print ink layer (a second primer layer) which is formed between said primer layer and the aforesaid topcoat layer. In that case, the print ink layer may be formed by the use of a coating solution for forming the print ink layer, said coating solution being prepared by dissolving polyvinyl chloride and a pigment, or polyester and a pigment or acrylic resin and a pigment, in such a solvent as toluene or methyl ethyl ketone.

On the surface of the primer layer formed in the above manner on the molded article of thermoplastic elastomer, a topcoat layer containing at least one compound selected from the group of saturated polyesters, polyvinyl chloride, acrylic ester resins and polyisocyanate is formed. When the primer layer contains only a saturated polyester, out of the saturated polyesters and chlorinated polyolefins as specified above, the topcoat layer to be formed must contain at least an acrylic ester resin.

To form the topcoat layer on the primer layer, it is sufficient that at least one compound selected from the group of saturated polyesters, acrylic ester, polyvinyl chloride resins and polyisocyanate is dissolved in an organic solvent, and the topcoat forming coating solution 50 obtained is coated according to conventional methods on the primer layer.

Saturated polyesters used for forming the topcoat include polyethylene terephthalate, polybutylene terephthalate and derivatives thereof. Acrylic ester resins used for the same purpose include (poly)methyl methacrylate, (poly)butyl methacrylate, (poly)isobutyl methacrylate, (poly)-2-ethylhexyl methacrylate, etc. Similarly, isocyanate resins include (poly)hexamethylene diisocyanate, (poly)isophorone diisocyanate, etc.

When the acrylic ester resin is contained in the topcoat layer, the surface of the molded articles becomes difficult to scratch. If the isocyanate resin is incorporated into the topcoat layer, the topcoat layer comes to have excellent surface characteristics and, at the same time, the incorporated isocyanate resin reacts with the primer layer or the thermoplastic elastomer, whereby the topcoat layer strongly adheres to the primer layer and the molded article of thermoplastic elastomer. Furthermore, if the saturated polyester is contained in the topcoat layer, a topcoat layer excellent in surface characteristics is obtained and, at the same time, integrity between the saturated polyester and the acrylic ester resin or the polyisocyanate can be maintained satisfactorily.

The topcoat layer used in the present invention preferably contains a combination of 80–10 parts by weight of an acrylic acid ester resin, 10–80 parts by weight of polyvinyl chloride and 10–60 parts by weight of silicic acid anhydride (silica); a combination of 95–5 parts by weight of a saturated polyester resin and 5–95 parts by weight of a polyisocyanate; a combination of 95–5 parts by weight of a polyisocyanate; or a combination of 80–15 parts by weight of a saturated polyester resin, 15–85 parts by weight of an acrylic ester resin and 20–5 parts by weight of a polyisocyanate. Of these combinations, a combination which contains the saturated polyester resin, acrylic ester resin and polyisocyanate is preferred.

In the present invention, it is necessary that the primer layer is first formed on the surface of the molded article of thermoplastic elastomer and then the topcoat layer is formed on the surface of said primer layer. If the topcoat layer is formed directly on the molded article, omitting the primer layer, a molded article of the thermoplastic elastomer excellent in surface characteristics such as abrasion resistance, crease-flex resistance and anti-sticking property cannot be obtained.

The topcoat forming coating solution may include, if necessary, silicic acid anhydride (silica), pigments, delustering agents, etc. in addition to at least one compound selected from the group of the above-mentioned saturated polyester resins, acrylic ester resins, polyvinyl chloride and polyisocyanate.

In particular, the addition to the coating solution of silicic acid anhydride (silica) in an amount of up to 100% by weight, preferably 10–60% by weight based on the above-mentioned resin is preferred.

Organic solvents used for dissolving the above-mentioned resins for use in the topcoat layer include methyl ethyl ketone, toluene, xylene, cyclohexane, methylene chloride, etc.

Of these solvents, particularly useful is a mixed solvent comprising toluene and methyl ethyl ketone. The solids contents in the coating solution for forming the topcoat is 5–50% by weight, preferably about 10–15% by weight.

The film thickness of the topcoat layer to be formed in the manner mentioned above on the primer layer surface is preferably 3–30 μm, more preferably about 10–20 μm.

To apply the primer layer forming coating solution and the topcoat layer coating solution, respectively, to the surface of the molded article of thermoplastic elastomer and that of the primer layer, there may be adopted the conventional coating methods using, for example, a gravure roll coater, roll coater, knife coater, screen coater, sprayer, etc.

Furthermore, the surface of molded articles of the thermoplastic elastomer of the present invention may be subjected, to corona discharge treatment prior to forming the primer layer.

In accordance with the present invention, it becomes possible to markedly improve the surface characteristics of the molded articles of the thermoplastic elastomer by forming the primer layer and topcoat layer on the surface of said molded articles. That is, the molded articles of thermoplastic elastomer used in the present invention have excellent physical properties, but, on the other hand, they have such problems that because they are of the polyolefin system, they are poor in scratch resistance of the surface and the surface thereof is apt to be attacked by hydrocarbon solvents. However, by virtue of forming the above-mentioned primer (undercoat) and topcoat layers on the surface of molded articles of thermoplastic elastomer in accordance with the present invention, the molded articles can be improved in abrasion resistance, anti-scratching properties, etc. and, moreover, surface gloss and surface touch of the molded article can be maintained in the optimal state. Furthermore, the above-mentioned primer and topcoat layer have excellent adhesion to the molded articles and, at the same time, have excellent adaptability to thermal deformation treatment of the molded articles.

EFFECT OF THE INVENTION

The molded articles of thermoplastic elastomer of the present invention have such excellent surface characteristics that the surface thereof is hard to scratch and excellent in external appearance as well as in touch and, moreover, the surface thereof is hard to subject to an attack by hydrocarbon solvents, since the present molded articles have the primer layer having a specific composition and the topcoat layer having a specific composition formed on the surface of molded articles prepared from the thermoplastic elastomer containing a polyolefin resin and a partially cross-linked product of ethylene/α-olefin copolymer rubber.

The molded articles of the present invention are used as leather-like products for the manufacture of sheet materials for interior automotive decoration (e.g. door, ceiling, seat, etc.), coverings (outer surface materials) for furniture such as chair, sofa, etc., covers of case, bag, book, etc., handbag and purse, etc.

The present invention is illustrated below with reference to the examples, but it should be construed that the invention is in no way limited to those examples.

In the following examples, surface characteristics of a coating comprising a primer layer and topcoat layer formed on the surface of molded article of thermoplastic elastomer were evaluated in the following manner.

1. 1. Adhesion of coating

Two days after coating, 100 squares are formed on the surface of coating by cutting said surface with a sharp-edged razor to give 11 cuts in parallel line at intervals of 2 mm, and 11 cuts in parallel line at intervals of 2 mm crossing at right angles thereover, thereby forming 100 squares of 2 mm of the coating. An adhesive cellophane tape, a product of Nichiban Co., Ltd., is then applied to the whole surface of the 100 squares thus formed, and immediately thereafter the tape is vigorously peeled off therefrom to examine the number of squares peeled off from the molded article surface. (The above test is hereinafter called the cross-cut adhesion test for short.)

The results obtained in the test were represented in terms of values calculated on the basis of the following formula.

$$\frac{\text{Number of undetached squares out of 100 squares formed}}{100}$$

| Example | |
|---|---|
| When no squares were detached at all | 100/100 |
| When all the squares were detached | 0/100 |

1. 2. Abrasion resistance test

Using a revolving vibrator type crockmeter as stipulated in 4. (1) of JIS L-0849, the surface of sheet is abraded 200 times under a continuous load of 500 g with Kanekin No. 3 as stipulated in an annexed table of JIS L-0803, and change in appearance of the surface of sheet thus abraded is evaluated according to the following ratings from A to E.

A. No change is observed at all in appearance of the surface tested.
B. Traces of the cotton fabric are left slightly on the surface tested.
C. The surface tested is injured.
D. The surface tested undergoes blushing.
E. Not only the surface tested but also the substrate thereof is destroyed.

1. 3. Crease-flex resistance test

Test sheet specimens, 3 cm×12 cm, are taken out of the molded sheet in a uniform direction, either longitudinally or laterally, in accordance with 5.17 Frictional Force, C Method (Scott Shape Method) as stipulated in JIS L-1005, and each specimen is fixed between two slide fasteners placed at an interval of 2 cm. The specimen thus fixed is frictioned back and forth 1000 times for a distance of 4 cm under a pressure loading of 1 kg (or 500 gr).

Ratings

A. No change is observed at all in appearance of the test specimen.
B. Blushing is observed slightly.
C. Blushing or peeling is observed.

1. 4. Anti-sticking test

The test is conducted in accordance with 9.7 Non-sticking Test as stipulated in JIS K-6772.

Two sheets of the test specimen, 90 mm×60 mm, are put one upon another so that their surfaces face to face, placed between two sheets of smooth glass plate, 60 mm×60 mm, and the resulting assembly on which a 2 kg weight is placed is allowed to stand for 24 hours in an air thermostat kept at 70° C.±2° C. The assembly is then taken out of the thermostat and the weight is removed therefrom, followed by allowing to cool for 1 hour at room temperature. The two test specimens thus treated are peeled off gently from each other to examine whether any change occurs on the surfaces of the test specimens thus peeled.

Ratings

A. No change such as damage or sticking is observed.
B. Sticking is observed to some extent.
C. Damage is observed.

1. 5. Solvent resistance test

The surface of the test specimen is strongly wiped with flannel impregnated with industrial gasoline to examine whether change occurs or not on the wiped surface.

Ratings

A. No change is observed at all.
B. Traces of cloudiness or the like are observed.
C. Damages caused by peeling or dissolving occur.

1. 6. Scratch test

A test specimen of 120 mm in diameter having perforated a hole of 6 mm in diameter in the center of said specimen was fixed by adhesion onto a turn table of a taper type scratch tester.

First, the cutterblade edge is placed quietly on the specimen under a load of 100 g so that said edge is in contact with the surface of the specimen on the turn table, and a switch of the tester is actuated to rotate the specimen at a rate of 0.5 or 1.0 rpm so that the edge scratches the surface of said specimen for a length of at least 1.5 mm, whereby the specimen tested is examined as to whether a scratch is formed or not on the outer skin of the specimen surface.

Next, the edge is lifted and the specimen is allowed to rotate, thereafter the edge is placed on the specimen under an increased load of 200 g, and the specimen is rotated so that the edge scratches another portion of the surface of said specimen to investigate whether the outer skin of the specimen surface is scratched or not. In case, no scratch is observed, the test is continued while increasing the load further to 300 g, 400 g or a larger one, and during this test the load is visually obtained, under which the outer skin of the specimen surface is scratched or broken, said load being taken as a scratch strength.

1. 7. Light resistance

A test specimen of 70 mm in width and 200 mm in length is attached to a fade-o-meter, and the specimen is irradiated for 400 hours at a black panel temperature of 83°±3° C. to visually observe the degree change or fading in color of the outer skin of the specimen surface. The test specimen is evaluated for light resistance according to the following Ratings.

1. 8. Moisture resistance

A test specimen of 100 mm×100 mm is placed in a thermo-hygrostant kept at 50° C.±2° C., and after the lapse of 400 hours the surface condition of the specimen is visually observed to evaluate moisture resistance thereof according to the following Ratings.

1. 9. Heat resistance

A test speciment of 100 mm×100 mm is placed in a thermostat kept at 100° C.±2° C., and after the lapse of 400 hours the surface condition of the specimen is visually observed to evaluate heat resistance thereof according to the following Ratings.

Ratings

A. No change is observed at all.
B. Almost inconspicuous, though a slight change is observed.
C. Less conspicuous, though change is observed apparently.
D. Change is somewhat noteworthy.
E. Change is considerably remarkable.

EXAMPLE 1

Step (1)

Preparation of thermoplastic elastomer

Using the following components, a themoplastic elastomer was prepared in the manner as mentioned hereinafter.

(A component): Ethylene/propylene/ethylidene norbornene copolymer rubber; Ethylene unit/propylene unit (molar ratio): 78/22, Iodine value 15, Mooney viscosity ($ML_{1+4}$, 121° C.) 61

(B component): Isotactic polypropylene resin; Melt index 13 g/10 min (230°)

(C component): Naphthene type process oil (D component): A mixture comprising 20% by weight of 1,3-bis(tert-butylperoxypropyl)benzene, 30% by weight of divinylbenzene and 50% by weight of paraffin type mineral oil In a Banbury mixer, a mixture comprising 55 parts by weight of (A component), 45 parts by weight of (B component) and 30 parts by weight of (C component) was kneaded in a nitrogen atmosphere at 180° C. for 5 minutes, and the resulting kneaded product was formed with a sheet cutter into square pellets.

In a henschel mixer, a mixture comprising 100 parts by weight of the square pellets obtained above and 1 part by weight, based on the square pellets, of (D component) was kneaded, and the kneaded product obtained was extruded in a nitrogen atmosphere at 220° C. with an extruder to prepare a thermoplastic elastomer.

Step (2)

Preparation of sheet-like molded article

The thermoplastic elastomer thus prepared was extruded with a 90 mm T-die extrusion molding machine manufactured and sold by Toshiba under such conditions that a screw is a full-flighted screw, L/D is 22, an extrusion temperature is 220° C., T-die is a coat hanger die, and a haul-off speed is 5 m/min, and cooled with a chill roll to prepare a sheet.

Step (3)

Surface treatment step

On the surface of the sheet prepared above was coated one time a coating solution for forming a first primer layer comprising 10 parts by weight of chlorinated polypropylene, 2 parts by weight of silicic acid anhydride and 88 parts by weight of toluene with a gravure roll of 120 meshes, followed by drying at 70° C. for 20 seconds.

On the surface of the first primer layer thus formed was coated a coating solution for forming a second primer layer comprising 8 parts by weight of polyvinyl chloride, 2 parts by weight of a pigment and 90 parts by weight of methyl ethyl ketone with a gravure roll to print a cloud pattern thereon, followed by drying at 70° C. for 20 seconds.

On the surface of the second primer layer thus formed was then coated one time a coating solution for forming a topcoat layer comprising 5 parts by weight of polyvinyl chloride, 5 parts by weight of polyacrylic ester, 3 parts by weight of silicic acid anhydride and 87 parts by weight of methyl ethyl ketone with a gravure roll of 100 meshes. With a far infrared heater, the sheet thus formed was heated until the surface temperature rises up to 180° C. and the surface of the sheet was subjected to emboss treatment.

Physical properties of the sheet-like molded articles obtained are shown in Table 1.

COMPARATIVE EXAMPLE 1

Substantially the same procedure as described in Example 1 was repeated except that no coating solutions for forming the primer layers were applied to the surface of the sheet in the step (3) of Example 1.

Physical properties of the sheet-like molded article obtained are shown in Table 1.

EXAMPLE 2

Step (1)

Preparation of thermoplastic elastomer

The step (1) of Example 1 was repeated.

Step (2)

Preparation of sheet-like molded article

The step (2) of Example 1 was repeated except that 80 parts by weight of the thermoplastic elastomer prepared above and 20 parts by weight, based on the thermoplastic elastomer, of a low density polyethylene Density 0.917 g/cm$^3$, Melt index 6.5 g/10 min (190° C.) were dryblended, and the blend obtained was fed to the T-die extrusion molding machine.

Step (3)

Surface treatment step

The step (3) of Example 1 was repeated.

Physical properties of the sheet-like molded article are shown in Table 1.

COMPARATIVE EXAMPLE 2

Substantially the same procedure as described in Example 2 was repeated except that no coating solutions for forming the primer layers were not applied to the surface of the sheet in the step (3) of Example 2.

Physical properties of the surface of the sheet-like molded article obtained are shown in Table 1.

EXAMPLE 3

Step (1)

Preparation of thermoplastic elastomer

The step (1) of Example 1 was repeated except that (C component), i.e. naphthene type process oil was not used.

Step (2)

Preparation of sheet-like molded article

The step (2) of Example 1 was repeated.

Step (3)

Surface treatment step

The sheet surface was subjected to oxidation treatment with a solid-state corona discharge treatment device until the surface tension thereof becomes 45 dyne/cm.

The thus corona treated surface of the sheet was coated one time with a coating solution for forming a first primer layer comprising 9 parts by weight of a saturated polyester, 2 parts by weight of silicic acid anhydride, 1 part by weight of polyisocyanate, 50 parts by weight of toluene and 38 parts by weight of methyl ethyl ketone using a 120-mesh gravure roll, followed by drying at 80° C. for 15 seconds. Subsequently, a cloud pattern was printed on the surface of the first primer layer thus formed with a gravure roll using a letter printing ink comprising 10 parts by weight of a saturated polyester, 2 parts by weight of a pigment, 50 parts by weight of toluene and 38 parts by weight of methyl ethyl ketone.

Furthermore, on the thus printed first prime layer, was coated a coating solution for forming a topcoat layer comprising 2 parts by weight of a saturated polyester, 7 parts by weight of polyacrylic ester, 2 parts by weight of silicic acid anhydride, 1 part by weight of polyisocyanate, 50 parts by weight of toluene and 38 parts by weight of methyl ethyl ketone using a 120-mesh gravure roll, followed by placing in a thermostat kept at 30° C. and curing for 24 hours.

COMPARATIVE EXAMPLE 3

Substantially the same procedure as described in Example 3 was repeated except that no coating solution for forming the primer layer was not coated on the sheet surface in the step (3) of Example 1.

Physical properties of the surface of the sheet obtained are shown in Table 1.

EXAMPLE 4

Step (1)

Preparation of thermoplastic elastomer

A thermoplastic elastomer was prepared by using the following (E component) in the manner as mentioned hereinafter.

(E component): A low density polyethylene having a melt index of 2 g/10 min (190° C.) and a density of 0.920 g/cm$^3$.

A mixture comprising 50 parts by weight of (A component), 25 parts by weight of (B component) and 25 parts by weight of (E component) was kneaded with a Banbury mixer in a nitrogen atmosphere at 180° C. for 5 minutes, and the kneadate was formed with a sheet cutter into square pellets. With a Henschel mixer, 100 parts by weight of the square pellets was mixed with 1 part by weight, based on the square pellets, of (D component) and extruded with an extruder in a nitrogen atmosphere at 220° C. to prepare the thermoplastic elastomer.

Step (2)

Preparation of sheet-like molded article

The step (2) of Example 1 was repeated.

Step (3)

Surface treatment step

On the sheet prepared above, was coated one time a coating solution for forming a primer layer comprising 10 parts by weight of chlorinated polypropylene, 2 parts by weight of silicic acid anhydride and 88 parts by weight of toluene using a 120-mesh gravure roll, followed by drying at 60° C. for 30 seconds.

Subsequently, on the surface of the primer layer thus formed was coated one time a coating solution for forming a topcoat layer comprising 2 parts by weight of a saturated polyester, 8 parts by weight of polyacrylic ester, 2 parts by weight of silicic acid anhydride, 50 parts by weight of toluene and 38 parts by weight of methyl ethyl ketone using a 120-mesh gravure roll.

Physical properties of the surface of the sheet obtained are shown in Table 1.

COMPARATIVE EXAMPLE 4

Substantially the same procedure as described in Example 4 was repeated except that the coating solution for forming the primer layer was not applied to the sheet surface in the step (3) of Example 4.

Physical properties of the surface of the sheet-like molded article obtained are shown in Table 1.

EXAMPLE 5

Substantially the same procedure as described in Example 1 was repeated except that the step (2) was carried out in the following manner.

Step (2)

Preparation of sheet-like molded article

The thermoplastic elastomer prepared was fed to a calender molding machine (18 B) manufactured and sold by Ishihara K. K. and processed at a hauling off speed of 30 m/min and 185° C. to prepare a sheet of 0.5 mm in thickness.

Physical properties of the surface of the sheet-like molded article are shown in Table 1.

COMPARATIVE EXAMPLE 5

Substantially the same procedure as described in Example 5 was repeated except that the coating solutions for forming primer layers were not applied to the sheet surface in the step (3) of Example 5.

Physical properties of the surface of the sheet-like molded article prepared are shown in Table 1.

TABLE 1

| Example | Ex. 1 | Compar. Ex. 1 | Ex. 2 | Compar. Ex. 2 | Ex. 3 | Compar. Ex. 3 | Ex. 4 | Compar. Ex. 4 | Ex. 5 | Compar. Ex. 5 |
|---|---|---|---|---|---|---|---|---|---|---|
| Adhesion of coating: | | | | | | | | | | |
| Cross-cut adhesion test | 100/100 | 0/100 | 100/100 | 0/100 | 100/100 | 3/100 | 100/100 | 0/100 | 100/100 | 0/100 |
| Abrasion resistance test | B | D | A | D | A | C | A | D | B | D |
| Crease-flex resistance test | A | C | A | C | A | B | A | C | A | C |
| Anti-sticking test | A | B | A | B | A | A | A | B | A | B |
| Solvent resistance test | B | C | B | C | A | B | B | C | B | C |
| Scratch test | 300 g | 200 g | 300 g | 200 g | 300 g | 200 g | 300 g | 200 g | 300 g | 200 g |

TABLE 1-continued

| Example | Ex. 1 | Compar. Ex. 1 | Ex. 2 | Compar. Ex. 2 | Ex. 3 | Compar. Ex. 3 | Ex. 4 | Compar. Ex. 4 | Ex. 5 | Compar. Ex. 5 |
|---|---|---|---|---|---|---|---|---|---|---|
| Light resistance | A | B | A | B | A | B | A | B | A | B |
| Moisture resistance | A | A | A | A | A | A | A | A | A | A |
| Heat resistance | A | B | A | B | A | A | A | B | A | B |

What is claimed is:

1. An article of thermoplastic elastomer comprising a molded article prepared from
   a thermoplastic elastomer containing a partially cross-linked product of ethylene/α-olefin copolymer rubber;
   a primer layer, formed on the surface of said molded article, said primer layer containing at least one compound selected from the group consisting of saturated polyesters and chlorinated polyolefin; and
   a topcoat layer, formed on said primer layer, said topcoat layer containing at least one compound selected from the group consisting of saturated polyesters, acrylic ester resins, polyvinyl chloride and polyisocyanate, with the proviso that the topcoat layer contains at least the acrylic ester resin when the primer layer consists only of the saturated polyester.

2. The article as claimed in claim 1 wherein the thermoplastic elastomer is composed of a composition comprising
   100-30 parts by weight of a partially cross-linked copolymer rubber composition (I) obtained by dynamically subjecting a mixture to heat treatment in the presence of a crosslinking agent, said mixture comprising
   (a) 100-20 parts by weight of an ethylene/α-olefin copolymer rubber,
   (b) 0-80 parts by weight of a polyolefin resin, the combined amount of (a)+(b) being 100 parts by weight, and
   0-200 parts by weight of at least one component selected from the group consisting of
   (c) peroxide-non-cross-linkable hydrocarbon rubbery substances and
   (d) mineral oil softening agents; and 0-70 parts by weight of a polyolefin resin (II).

3. The article as claimed in claim 1 wherein the primer layer contains chlorinated polyolefin and silicic acid anhydride.

4. The article as claimed in claim 1 wherein the saturated polyester is polyethylene terephthalate, polybutylene terephthalate or a derivative thereof.

5. The article as claimed in claim 1 wherein the chlorinated polyolefin is chlorinated polyethylene, chlorinated polypropylene or an ethylene chloride/α-olefin copolymer.

6. The article as claimed in claim 1 wherein the primer layer has a film thickness of 10-20 μm.

7. The article as claimed in claim 1 wherein the topcoat layer has a film thickness of 3-30 μm.

8. The article as claimed in claim 1 wherein the topcoat layer contains an acrylic acid ester, polyvinyl chloride and silicic acid anhydride.

9. The article as claimed in claim 1 wherein a second primer layer consisting essentially of a printed ink is provided between said primer layer and said topcoat layer.

10. The article as claimed in claim 1 wherein said article is in the form of a sheet.

* * * * *